United States Patent Office 3,020,860
Patented Feb. 13, 1962

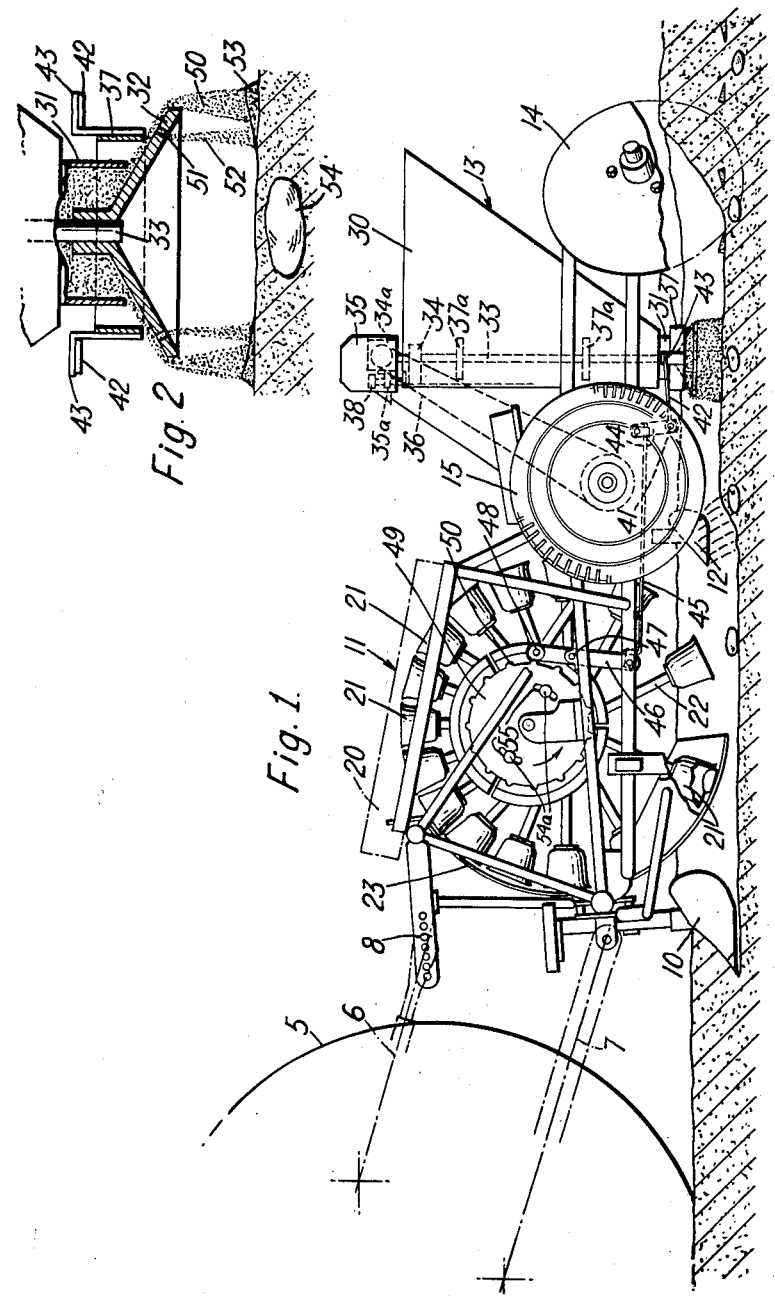

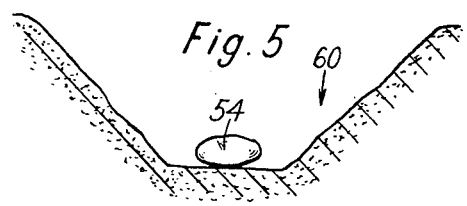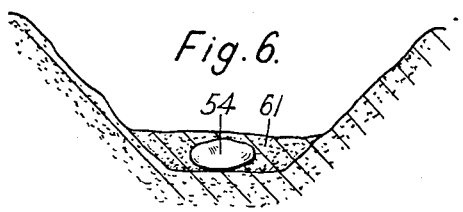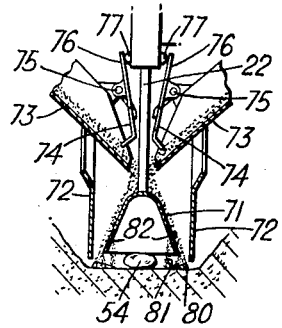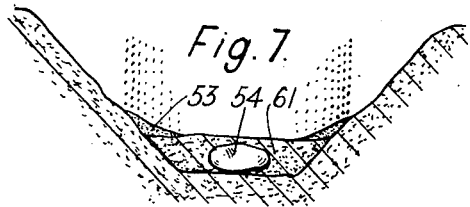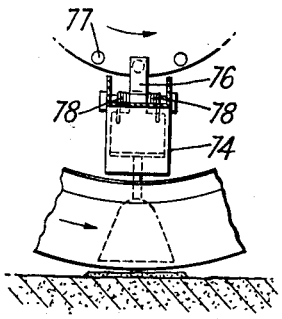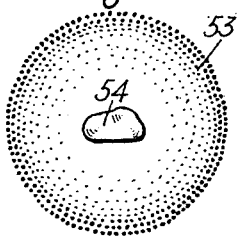

3,020,860
PLANTING MACHINES FOR POTATOES
AND OTHER SEEDS
Percival James Packman, % Packman Machinery
Limited, Twyford, England
Filed Apr. 4, 1958, Ser. No. 726,397
Claims priority, application Great Britain July 22, 1957
6 Claims. (Cl. 111—34)

This invention relates to machines for planting potatoes and other seeds which require to be planted in a row at regular intervals either singly or in groups. For convenience such seeds will be referred to generally as potatoes, although other seeds, for example those of sugar beet, may require to be planted in the same way.

A construction of planting machine is described in my earlier Great Britain patent specification No. 599,501 and an improved version of the machine is described in my Great Britain patent specification No. 655,169. Both forms of machine described in these specifications enable the potatoes to be planted in straight rows with very considerable accuracy of spacing or pitch.

In addition to the actual planting operation a further operation which is necessary, either at or before the time of planting, is the spreading of fertilizer. Most simply this is merely broadcast over the land before the formation of the furrows or valleys for the reception of the potatoes. This method is far from economical, however, since only a relatively small proportion of the total area is, in fact, occupied by the feeding roots of the potatoes and the remainder of the fertilizer is effectively wasted. As an improvement on this therefore, the fertilizer may be spread after the formation of the furrows or valleys, being confined merely to the rows along which the potatoes are to be planted. Apart from the fact that even with this method of spreading a considerably larger area of ground than that occupied by the potato roots is covered, there is the added danger that the potatoes will be planted directly in contact with the fertilizer leading to risk of burning or scorching of the tender young shoots. This risk may be partly overcome by spreading the fertilizer in two bands or strips along either side of the furrow or valley so that the potatoes may be planted between the two strips, but even if this is done the proportion of fertilizer which is effective is not very large because it is spread over the parts of the rows between the potatoes.

According to the present invention the planting and fertilizer placement are carried out substantially simultaneously by means of apparatus which, in addition to the planting mechanism itself, also includes mechanism for releasing patterns of fertilizer at intervals corresponding to the pitch of the planted potatoes, the planting mechanism and the releasing mechanism being so coordinated that each planted potato lies substantially in the middle of the corresponding pattern of fertilizer. In this way the fertilizer is spread only where it is required and little or none is wasted by being spread in the spaces between potatoes.

As previously mentioned it is important that the fertilizer should not come into direct contact with the planted potatoes in order to avoid the danger of burning or scorching the young shoots. Preferably therefore the apparatus includes means for interposing a layer of earth between each potato and the corresponding pattern of fertilizer. Alternatively or in addition, the releasing apparatus may be so designed that each pattern comprises a central space which has little or no fertilizer and in this event the interposition of a layer of earth between each potato and the fertilizer is not essential.

Most conveniently the fertilizer is spread in an approximately circular ring surrounding each potato and the centre of this ring may or may not include a reduced proportion of fertilizer. As an alternative to a circular ring, however, the fertilizer may be laid in other configurations such as square, or may comprise two or more separate patches with a space between for the planting of the potato. The essential requirement is, of course, that whether the fertilizer is spread in a ring or in an open-centered pattern, it should only be spread in the immediate vicinity of each potato planted so that no appreciable quantity of fertilizer is wasted in the spaces between potatoes in each row.

In order to release the fertilizer at the correct intervals the releasing mechanism may include a valve which is operated in synchronism with the operation of the planting mechanism. This valve may be supplied from a hopper, the outlet from which leads onto a rotary blade in the form of a shallow cone which distributes the fertilizer released by the action of the valve.

In order to obtain the correct relationship between each potato and the corresponding pattern of fertilizer a number of combinations is possible. It is found to be most convenient for the planting mechanism to precede the releasing mechanism so that each potato is first laid in position and the corresponding pattern of fertilizer is then released in the correct relationship to the potato. Alternatively, however, it is equally possible for the fertilizer to be released prior to the planting of the potato. Yet again the fertilizer may be released substantially simultaneously with the planting of the potato by means of a composite planting and releasing mechanism.

Apparatus in accordance with the invention will now be described in more detail by way of example with reference to the accompanying drawings in which:

FIGURE 1 is a side elevation of one form of apparatus in accordance with the invention;

FIGURE 2 is a detailed view to an enlarged scale of part of the fertilizer releasing mechanism shown in FIGURE 1;

FIGURES 3 and 4 are a detailed end view and side view respectively of composite mechanism for the simultaneous planting of a potato and release of fertilizer; and FIGURES 5 to 9 are diagrammatic views illustrating the successive stages in the planting operation.

The apparatus shown in FIGURE 1 is intended for towing behind a tractor, the rear wheels of which are shown in outline at 5. The apparatus is secured to the tractor by the normal upper and lower links shown in dotted lines at 6 and 7 respectively, the attachment of the link 6 being made adjustable by the provision of a row of holes 8.

The apparatus comprises five essential components, namely a plough blade 10 which opens up a furrow for the planting of the potatoes, planting mechanism indicated generally as 11 which plants potatoes at a substantially constant pitch in the furrow so opened up, advance covering blades 12 which provide a light covering of earth over the planted potatoes, a fertilizer releasing mechanism shown generally as 13 which releases a pattern of fertilizer in the vicinity of each planted potato and final covering discs 14 which cover in the furrow to leave the potatoes planted at the correct depth. The apparatus runs on a pair of land wheels 15 which support the whole weight of the apparatus apart from that carried by the links 6 and 7 and from which mechanical drive to the components of the apparatus is taken.

The planting mechanism 11 is constructed substantially in accordance with British patent specification No. 655,169 and consequently requires only a brief description. For present purposes it is sufficient to say that potatoes from a tray 20 are placed manually in planting cups 21, mounted at the ends of radially-extending arms 22. The assembly of arms is driven in a counterclockwise direction by means of a chain or belt drive (not shown) taken from the land wheels 15.

Immediately after leaving the vicinity of the operator the cups pass beneath a circumferential guard 23 which holds the potatoes in their cups even when the inverted position shown at 21 is reached. During their movement from the feeding position the cups 21 are gradually separated in the direction of rotation until the end of the guard 23 is reached, when each potato passes beyond the end of the guard and is placed accurately in the bottom of the furrow opened up by the plough blade 10. The closeness of the planting cup 21 to the ground at the release point prevents the planted potato from bouncing or rolling and as the arm 22 is rotated so that the planting cup has practically no speed relative to the ground very great accuracy is obtained in placing the potato. The mechanism for operating the arms 22 is described in detail in the previously mentioned specification.

As the apparatus moves forwardly, each potato which has been planted is given a preliminary covering of earth by the blade 12, after which a pattern of fertilizer is released as previously described. The releasing mechanism comprises a hopper 30 which is filled with fertilizer and the outlet from which is in the form of a vertical passage 31 better seen in FIGURE 2. The walls of this passage stop just short of a rotary plate 32 which is made of tough rubber or metal and which is in the form of a shallow cone. The plate is driven by a shaft 33 the bottom end of which is seen in FIGURE 2, and which extends upwardly through the body of the fertilizer in the hopper 30. The shaft passes through an upper bearing 34 and is driven by bevel gearing 34a included in a casing 35. This bevel gearing in its turn is driven by a chain drive 36 from the land wheels 15. The shaft 33 operates stirrers 37a which serve to agitate the fertilizer in the hopper 30 and also assist in breaking up any lumps which may form.

The walls of the vertical passage 31 stop just short of the surface of the rotary plate 32 and act as a weir controlling the flow of the granular fertilizer downwardly along the surface of the plate. Further flow is controlled by a short cylinder 37 which is normally in contact with the plate 32 and which acts as a valve controlling the release of the fertilizer. As long as the cylinder 37 is in contact with the plate 32 fertilizer accumulates between the cylinder 37 and the walls of the passage 31 at a rate dependent on the gap between the walls of the passage 31 and the plate 32. The bevel gear is mounted in a housing enclosed within the casing 35, and the housing has a plate 35a extending laterally therein. The plate has a hole bored through it through which passes the shank of an adjusting screw 38, the end of which bears on the top of hopper 30. As this screw is rotated, the plate 35a is thus raised or lowered with respect to the hopper so that the plate 32 is also raised or lowered toward or away from the walls of the passage 31 so controlling the width of the gap between these walls and the plate. This screw 38 therefore controls the flow of the fertilizer which passes from the hopper 13 through the passage 31 to the plate 32 and thus controls the quantity of fertilizer which is released when the cylinder 37 is raised.

The raising operation is carried out by means of a bellcrank lever pivoted at 41 to the frame of the apparatus and one arm of which 42 is arranged to lift the cylinder 37 by lugs at 43. The other arm 44 of the bellcrank lever is connected to a link 45 which, in its turn, is connected to a further lever 46 pivoted at 47 to the frame of the apparatus. At its further end this lever 46 carries a cam follower 48 co-operating with a circular cam 49 formed with a series of projections 50. Each time a projection 50 engages the cam follower 48 the lever 46 is rocked in a clockwise direction, thus rocking the arm of the lever 44 in a counter-clockwise direction and so lifting the valve cylinder 37 to release a pattern of fertilizer.

As already described the plate 32 is caused to rotate by means of the shaft 33 and this rotational effect causes the granular fertilizer to flow over the edges of the plate as seen at 50 in FIGURE 2. In addition, a ring of small openings 51 is provided around the plate through which a smaller quantity of fertilizer shown as 52 is allowed to fall. As a result each time the valve cylinder 37 is lifted a ring 53 of fertilizer is released onto the ground, the quantity of fertilizer decreasing towards the center of the ring. It is important that the ring should be accurately located in relation to the respective potato seen at 54 in FIGURE 2 and in order to adjust the operation of the valve cylinder 37 in relation to the planting of the potatoes the cam 49 is made adjustable by the provision of screws 54a working in elongated slots 55. By slackening the screws 54a the cam 49 can be rotated slightly in relation to the planting mechanism as a whole so that the lifting of the valve cylinder 37 is correspondingly adjusted.

The results obtained by the operation just described are illustrated in FIGURES 5 to 9. FIGURE 5 shows a furrow 60 which has been opened up by the passage of the plough blade 10 and a potato 54 which has been planted in the middle of the furrow by means of the planting mechanism. In the next stage of the operation the advance covering blades 12 have removed a quantity of earth from the side of the furrow 60 and has deposited it as a preliminary covering 61 on top of the potato 54. This covering 61 is important because it prevents direct contact between the fertilizer and the potato. As seen in FIGURE 7 the ring of fertilizer 53 is next deposited on the covering 61 and finally, as seen in FIGURE 8, the covering discs 14 cover in the furrow to leave the potato 54 planted at the correct depth with the ring of fertilizer 53 surrounding it and slightly above it. The result is seen in plan view in FIGURE 9.

In normal soils the effect of rain and weather will be to cause the fertilizer 53 to be washed downwardly into the region of the roots put out by the potato 54 and this is an added reason for having the fertilizer slightly above the potato. In some types of soil there is no disadvantage in having the fertilizer on the same level as the potato provided the ring has a relatively open center and the fertilizer does not come into direct contact with the young shoots. In particularly light soils it may even be desirable to place the fertilizer slightly below each potato. In this event the apparatus shown in FIGURE 1 needs to be modified so that the fertilizer is first released, a preliminary covering is applied and the potato is then planted. If the fertilizer is to be at the same level as the potato no preliminary covering is required and it is immaterial whether the potato is planted before or after the release of fertilizer. The two operations may, in fact, be carried out simultaneously and details of part of the apparatus modified for operation in this way are shown in FIGURES 3 and 4.

In these views the planting cups are shown as 71 and are of slightly different shape from the cups 21 shown in FIGURE 1, since they also serve as deflectors for the fertilizer. The cups 71 are carried by arms 22 in the same manner as in FIGURE 1 and as they move into the planting position pass between a pair of side guards 72. Directed inwardly above these guards 72 are two ducts 73 which lead granular fertilizer from a hopper which is not shown in the drawing but which has an outlet in much the same manner as the hopper 30 shown in FIGURE 1 which releases fertilizer at a controlled rate to flow down the ducts 73.

Flow of fertilizer down the ducts 73 is controlled by a pair of valve members 74, each pivoted at 75 and having a tail portion 76 which co-operates with cam projections 77 which are provided on the planting mechanism in similar positions to the projections 50 shown in FIGURE 1.

As each pair of projections 77 passes the corresponding tail part 76 of the valve member 74, these latter are rocked against the effect of biassing springs 78 into the open position shown in FIGURE 3 so as to allow a measured quantity of fertilizer to fall onto the planting cup 71. This is deflected by the cup to form a ring 80. A small quantity of fertilizer 81 passes through openings 82 in the cup to create the same effect as the fertilizer 52 shown in FIGURE 2. The ring 80 thus formed is not truly symmetrical but the fertilizer is evenly spaced on either side of the potato 54 and is prevented from coming into direct contact with it. As previously mentioned the result is that the fertilizer is deposited at the same level as the potato and no preliminary covering is required. The furrow is first opened up by the blade 10 and after the simultaneous planting and fertilization it is covered in again by the discs 14.

The apparatus may serve for the simultaneous planting of two, three or four rows of potatoes. For this purpose the components already described need to be reproduced for each row to be planted although a single hopper may extend across the width of the apparatus in order to serve each row. The apparatus is, of course, so designed that the tractor wheels 5 and the land wheels 15 run between the furrows.

I claim:

1. In combination with a planter having furrow opening means and means for placing a row of substantially equally spaced seeds in the ground, said planter including a framework, means mounted on said framework for releasing fertilizer in a pattern registering with one of said seeds but spaced therefrom comprising a hopper having a circular outlet at the bottom thereof, a shaft mounted within said hopper and having one end projecting into said outlet, a conical plate mounted on said one end of said shaft and having its downwardly and outwardly extending surface spaced from said outlet and defining a gap therebetween for permitting a quantity of fertilizer to flow from said outlet onto said surface, a cylinder disposed about said outlet and normally engaging said conical plate surface to prevent flow of fertilizer down said conical plate surface and thus store a predetermined quantity of fertilizer in the form of a ring on said plate surface within said cylinder, means on said hopper for continuously rotating said shaft and said plate at a substantially constant speed, and means on said seed placing means connected to said cylinder for periodically abruptly raising said cylinder out of engagement with said plate in synchronism with the operation of said seed placing means as one of said seeds is placed on the ground to thereby encircle one of said seeds with a ring of fertilizer circumferentially spaced from and out of contact with the said one seed.

2. The construction as defined in claim 1 further including means on said hopper for adjusting said gap by relative movement of said shaft and said plate to said outlet whereby a metered quantity of fertilizer is permitted to flow down from said hopper onto said plate.

3. The construction as defined in claim 1 wherein said cylinder raising means include a pivotally mounted bell crank connected at one end to said cylinder and at the other end linked to a cam follower on said potato placing apparatus and a rotating cam on said apparatus triggering said bell crank by means of said follower in synchronization with the placing of each potato on the ground to abruptly raise and lower said cylinder and quickly releasing a predetermined amount of fertilizer in a particular pattern about each of said potatoes.

4. The construction as defined in claim 1, wherein said cylinder normally engages said conical plate surface at a position spaced radially inward from the outer peripheral edge of said conical plate, and wherein said conical plate is provided with a plurality of perforations between said cylinder engaging position and the outer peripheral edge of said conical plate.

5. In combination with means for placing seeds on the ground at a substantially constant pitch, means for releasing fertilizer in patterns registering with but spaced from said seeds comprising a hopper for said fertilizer having an outlet at the bottom thereof, a rotatable conical plate having its downwardly and outwardly extending surface located beneath said outlet and spaced therefrom to define a gap therebetween, means for rotating said conical plate at a substantially constant speed relative to said outlet, a cylinder disposed about said outlet and normally engaging said plate surface to prevent flow of fertilizer down said conical plate surface and thus store a predetermined quantity of fertilizer in the form of a ring on said plate surface within said cylinder, means on said seed-placing means connected to said cylinder for periodically abruptly raising said cylinder from engagement with said plate in synchronism with the operation of said seed-placing means as said seeds are placed on the ground whereby on each occasion when said cylinder is raised the ring of fertilizer is released so that said seeds lie substantially in the middle of, but out of contact with, said ring of fertilizer.

6. The construction as defined in claim 5 including means for adjusting said gap by relative movement of said conical plate to said outlet whereby a metered quantity of fertilizer is permitted to flow down from said hopper to said plate.

References Cited in the file of this patent

UNITED STATES PATENTS

| 50,089 | Bacon | Sept. 26, 1865 |
| 149,278 | Couteau | Mar. 31, 1874 |
| 408,378 | Cummings | Aug. 6, 1889 |
| 1,107,992 | Parrish | Aug. 18, 1914 |
| 1,166,477 | Parrish | Jan. 4, 1916 |
| 1,755,498 | Boss | Apr. 22, 1930 |
| 1,921,885 | Kriegbaum et al. | Aug. 8, 1933 |
| 1,993,649 | Crutcher | Mar. 5, 1935 |
| 2,153,991 | Pettett | Apr. 11, 1939 |
| 2,222,015 | Bateman | Nov. 19, 1940 |
| 2,641,476 | Keleher | June 9, 1953 |

FOREIGN PATENTS

| 655,169 | Great Britain | July 11, 1951 |